Figure 1:
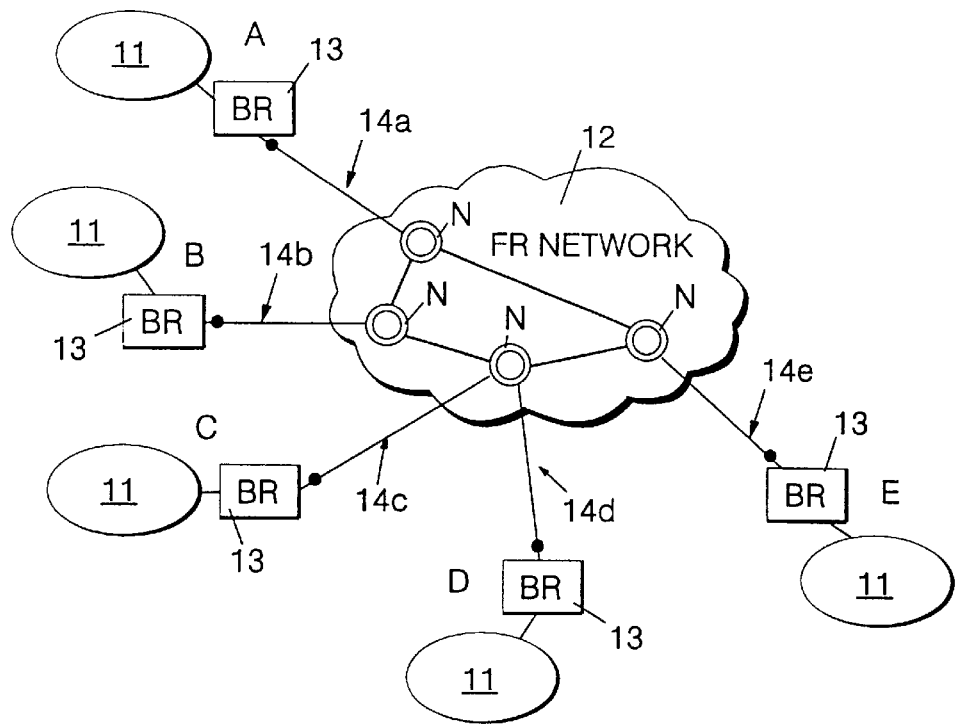

United States Patent [19]
Pajuvirta et al.

[11] Patent Number: 5,889,762
[45] Date of Patent: Mar. 30, 1999

[54] CONTROL OF OVERLOAD SITUATIONS IN FRAME RELAY NETWORK WHICH DISCARDS THE CONTENTS OF A VIRTUAL-CHANNEL-SPECIFIC BUFFER WHEN SAID BUFFER IS FULL

[75] Inventors: Juha Pajuvirta; Heikki Salovuori, both of Helsinki; Jorma Matkaselkä, Vantaa; Mika Kasslin; Seppo Pyhälammi, both of Helsinki; Mikko Olkkonen, Espoo; Richard Fehlmann; Mikko Laiho, both of Helsinki, all of Finland

[73] Assignee: Nokia Telecommunications OY, Espoo, Finland

[21] Appl. No.: 647,950

[22] PCT Filed: Nov. 29, 1994

[86] PCT No.: PCT/FI94/00534

§ 371 Date: Sep. 24, 1996

§ 102(e) Date: Sep. 24, 1996

[87] PCT Pub. No.: WO95/15636

PCT Pub. Date: Jun. 8, 1995

[30] Foreign Application Priority Data

Nov. 30, 1993 [FI] Finland ..................................... 935364

[51] Int. Cl.⁶ ................................ H04J 1/16; H04J 3/14; H04L 12/28; H04L 12/56
[52] U.S. Cl. ........................... 370/230; 370/235; 370/412
[58] Field of Search .................................... 370/230, 235, 370/236, 412, 468, 414, 418, 415, 416

[56] References Cited

U.S. PATENT DOCUMENTS

| | | | |
|---|---|---|---|
| 5,140,584 | 8/1992 | Suzuki ..................................... | 370/60 |
| 5,163,046 | 11/1992 | Hahne et al. . | |
| 5,231,633 | 7/1993 | Hluchyj et al. ......................... | 370/94.1 |
| 5,233,606 | 8/1993 | Pasham et al. ......................... | 370/85.6 |
| 5,521,923 | 5/1996 | Willmann et al. ...................... | 370/94.1 |

FOREIGN PATENT DOCUMENTS

| | | |
|---|---|---|
| 0 499 150 | 8/1992 | European Pat. Off. . |
| 0 544 452 | 6/1993 | European Pat. Off. . |
| 92/07438 | 4/1992 | WIPO . |
| 93/14605 | 7/1993 | WIPO . |

OTHER PUBLICATIONS

CCITT, The International Telegraph and Telephone Consultative Committee, "Frame Mode Bearer Services", I.233, Geneva, 1992.

CCITT, The International Telegraph and Telephone Consultative Committee, "ISDN Data Link Layer Specification for Frame Mode Bearer Services", Q.922, Geneva, 1992.

CCITT, The International Telegraph and Telephone Consultative Committee, "Congestion Management for the ISDN Frame Relaying Bearer Service", I.370, Geneva, 1991.

"An Overview of Frame Relay Technology", *System Design*, Apr. 1991.

Grimshaw, Michael, "LAN Interconnections Technology" *Feature*, Jun. 1991, pp. 37–46.

Jaakonmäki, Leena, "Lähiverkko–opa".

A. Platt & M.J. Morse, "Traffic management in frame relay networks," Computer Networks and ISDN Systems, vol. 23, No. 4 (Jan. 1992), pp. 305–316.

(List continued on next page.)

*Primary Examiner*—Douglas W. Olms
*Assistant Examiner*—David R. Vincent
*Attorney, Agent, or Firm*—Pillsbury Madison & Sutro LLP

[57] ABSTRACT

The invention relates to a method for congestion management in an FR network. The method comprises determining the virtual channel associated with a frame to be transmitted when it is received from a subscriber connection at a subscriber node. In order for the load in the network to be reduced, (a) data is buffered at the input boundary of the subscriber node to virtual-channel-specific buffers ($62_1 \ldots 62_n$), (b) the fill rate of said buffers is monitored continuously, and (c) when a frame is received in a virtual-channel-specific buffer which is full, substantially all the contents of the buffer are discarded.

4 Claims, 2 Drawing Sheets

OTHER PUBLICATIONS

Japanese Patent Un–Examined Publication 4–276948 (published in 1992).

M. Nassehi, "Window flow control in frame–relay networks," IEEE GLOBECOM '88, (1988) No. 3, pp. 1784–1790 (refer to under the ... buffer is full in left column, lines 15–19 in p. 1789).

CONTROL OF OVERLOAD SITUATIONS IN FRAME RELAY NETWORK WHICH DISCARDS THE CONTENTS OF A VIRTUAL-CHANNEL-SPECIFIC BUFFER WHEN SAID BUFFER IS FULL

This application claims benefit of international application PCT/FI94/00534, filed Nov. 29, 1994.

The invention relates to a method according to the preamble of appended claim 1 for congestion management in a frame relay network, and to a subscriber node according to the preamble of appended claim 3.

Congestion means a situation in which the number of transmission requests exceeds the transmission capacity at a certain network point (called a bottle-neck resource) at a specific time. Congestion usually results in overload conditions, as a result of which the buffers overflow, for instance, and so packets will be retransmitted either by the network or the subscriber. The function of congestion management (CM) is to maintain a balance between the transmission requests and the transmission capacity so that the bottle-neck resources operate on an optimal level, and the subscribers are offered service in a way that assures fairness.

Congestion management can be divided into congestion avoidance (CA) and congestion recovery (CR). Congestion avoidance methods aim at preventing the occurrence of congestion in the network by dynamically adjusting the bandwidth of the subscribers in accordance with network congestion conditions and/or by altering the network routing so that part of the traffic load of the bottle-neck resources is shifted to idle resources. The purpose of recovery methods, in turn, is to restore the operation of the bottle-neck resources to an optimal level if the avoidance methods have failed to prevent the occurrence of congestion.

The frame relay (FR) technique is a packet-switched network technique used for the transmission of frames of varying length in place of the packet-switched network connections presently in use. The protocol (X.25) applied generally in the present packet-switched networks requires plenty of processing and the transmission equipment is expensive, as a result of which the speeds also remain low. These matters are due to the fact that the X.25 standard was developed when the transmission connections used were still rather prone to transmission errors. The starting point of the frame relay technique was a considerably lower transmission line error probability. It has therefore been possible to discard a number of unnecessary functions in the frame relay technique, which makes the delivery of frames rapid and efficient. The Frame Mode Bearer Service is described generally in CCITT recommendation I.233 (Reference 1) and the associated protocol in recommendation Q.922 (Reference 2). Congestion in an FR network and congestion management mechanisms are described in CCITT recommendation I.370 (Reference 3). For a more detailed description of the FR technique, reference is made to *An Overview of Frame Relay Technology*, Datapro Management of Data Communications, McGraw-Hill Incorporated, April 1991, (Reference 4) as well as the above-mentioned recommendations.

As a last resort in cases of extremely severe congestion in a frame relay network, frames can be discarded. Situations of this kind arise when both the transmission capacity of the network and the buffering capacity of a single node are exceeded. In the congestion management mechanisms presently used, frames are discarded almost randomly both on the periphery of the network (at subscriber nodes) and in the middle of the network (at trunk nodes). A frame is discarded if it cannot be buffered due to lack of space, or if the fill rate of the buffer is sufficiently high and the frame contains an indication which allows it to be discarded in the event of congestion, for instance. Nothing is done to affect the buffer itself; it continues to be emptied to the data link as normal. If the frame is not discarded until at a congested node, the other resources of the network are loaded in vain. The frame must be switched through the network up to the point where it is discarded, i.e. to the congested node, which means wasting the resources.

The object of the present invention is to obviate the drawback described above and to provide a new type of congestion management method for a frame relay network, said method allowing unnecessary loading of the network to be avoided. This is achieved with a method according to the invention, which is characterized by what is disclosed in the characterizing part of appended claim 1. The FR network subscriber node according to the invention is characterized by what is disclosed in the characterizing part of appended claim 3.

The idea of the invention is to empty the contents of an entire virtual-channel-specific buffer at a time on the periphery of the network at a subscriber node where the frames are buffered to virtual-channel-specific buffers. (The virtual channel refers to a virtual connection portion having the length of one transmission link while the virtual connection is the actual packet-switched end-to-end FR connection.)

The method according to the invention makes it possible to avoid discarding random frames, on account of which the applications do not have to retransmit packet sequences as often as before.

Figure 2:
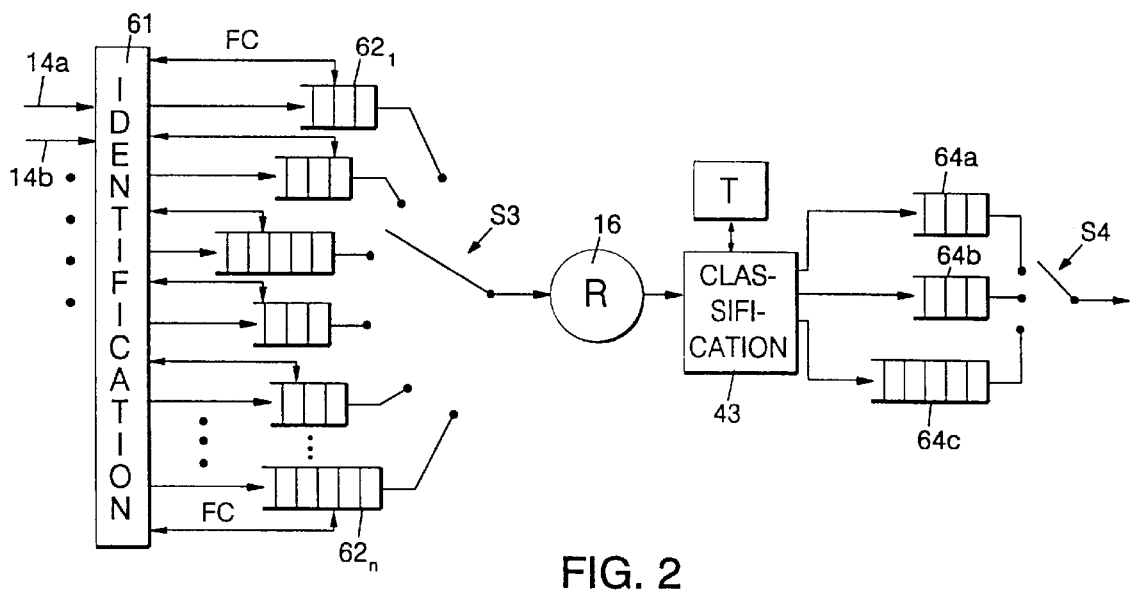
Figure 3:
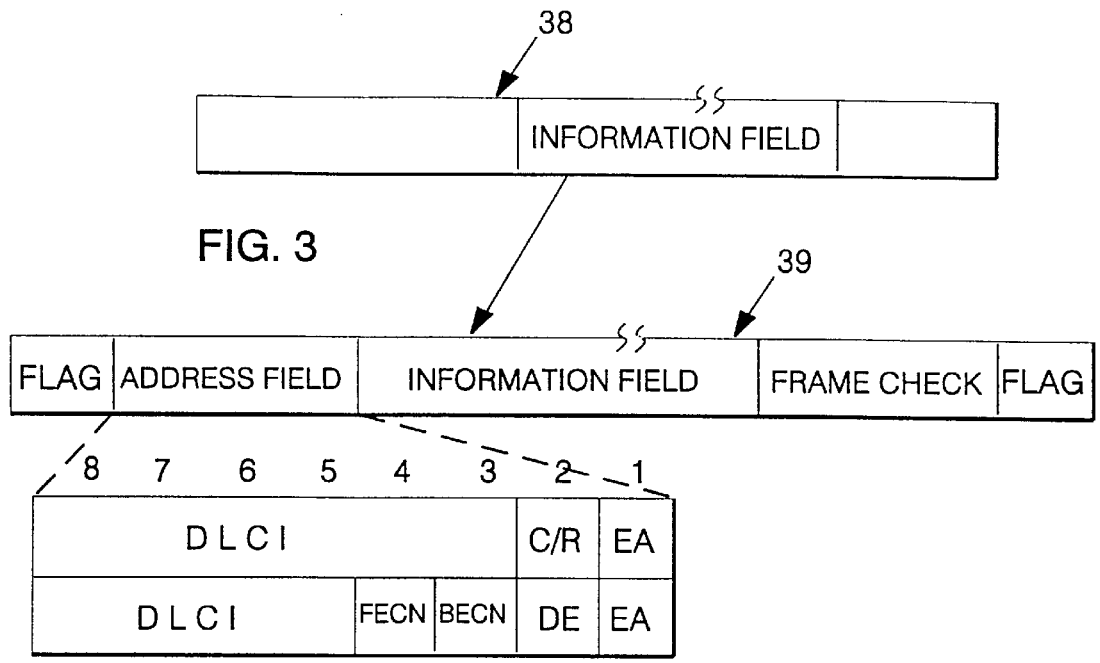
Figure 4:
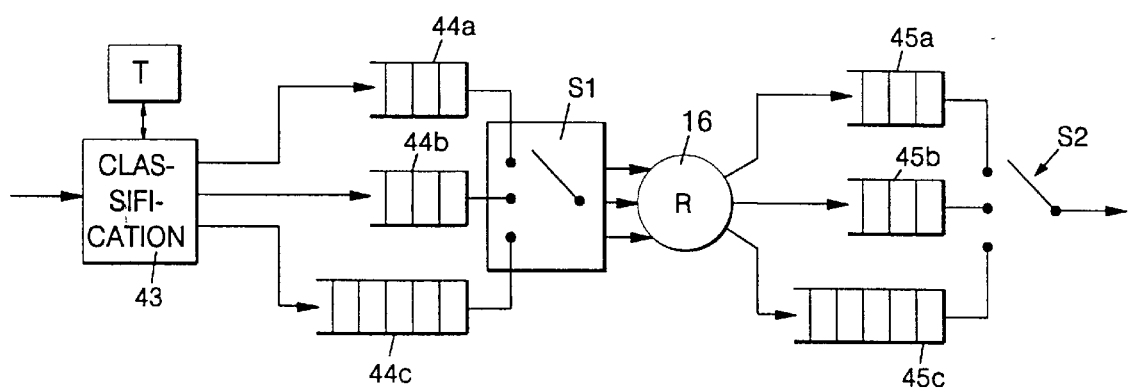

In the following, the invention and its preferred embodiments will be described in greater detail with reference to the examples illustrated in the accompanying drawings, in which FIG. 1 illustrates a typical operating environment of the method according to the invention, FIG. 2 illustrates an FR network subscriber node according to the invention, FIG. 3 illustrates the format of a frame to be delivered in an FR network, and FIG. 4 illustrates a trunk node of an FR network employing the method according to the invention.

A frame relay network can be used by several different applications, which do not require similar services. It is therefore advantageous to employ the method of the invention in a network where the services are divided into different classes according to the applications, taking into account the two most significant parameters (frame loss probability and delay). Such a solution is disclosed in Finnish Patent Application No. 925671. In this application, it is suggested that the services be divided into three classes as follows:

the first service class (class 1) offers interactive service where the delay is kept short, the second service class (class 2) offers a low frame loss probability without the delay having any great significance, and the third service class (class 3) offers both a short delay and a low frame loss probability.

Each trunk connection of a network realized in this way has service-class-specific buffers, one for each service class. A subscriber node, in turn, has virtual-channel-specific buffers on the side of the subscriber interface. These solutions will be described more closely below; otherwise reference is made to the Finnish patent application cited above.

(Subscriber) applications using a frame relay network send data towards the network in frames, typically a so-called window at a time. If the application and the protocol used by it detect that a frame included in a window has been lost, the entire window is usually retransmitted instead of transmitting only the frame that has been lost. Thus the loss of one frame in the network affects the application in the same way as the loss of an entire window. In each case, the application protocol must retransmit a whole windowful of frames.

FIG. 1 shows an FR network offering public network services, that is, a frame relay network 12 interconnecting local area networks 11 of different offices A . . . E of a single corporation or a plurality of corporations. The local area network 11 of each office has access to the FR service via a local area network bridge 13 and a data link indicated with the references 14a . . . 14e, respectively. The connection between an FR subscriber A . . . E and an FR network node N is known per se, wherefore it will not be described more closely herein. More detailed information about local area networks and bridges used in their interconnection can be found e.g. in an article by Michael Grimshaw *LAN Interconnections Technology*, Telecommunications, February 1991, and in Lähiverkko-opas, Leena Jaakonmäki, Suomen ATK-kustannus Oy, 1991, which are incorporated herein by reference.

A typical feature of the known node structure of the FR network is that the same buffer is used for all frames, assuming that they are routed to the same physical connection. According to the present invention, on the contrary, buffers corresponding to the above-described service classes are preferably provided at the output boundary of all network nodes and at the input boundary having trunk connections. FIG. 2 illustrates this kind of solution at a trunk node in the network. The node receives FR frames originally assembled in the bridges 13 of the subscriber connections (FIG. 1). The frame of the subscriber LAN 11 is inserted into the information field of the FR frame in the bridge 13 (with the exception of timing bits and other similar bits). FIG. 3 illustrates the insertion of a LAN frame 38 into the information field of an FR frame 39. It also shows a typical FR network frame format where the address field preceding the information field comprises two octets (bits 1 to 8). The bits 3 to 8 of the first octet and the bits 5 to 8 of the second octet form a data link connection identifier DLCI, which indicates to the node e.g. the virtual connection and virtual channel to which a particular frame belongs. The virtual channels are distinguished from each other by means of the data link connection identifier. The data link connection identifier, however, is unambiguous only over a single virtual channel, and it may change in the node on transition to the next virtual channel. The bit 2 of the second address field octet, called a DE bit (Discard Eligibility Indicator), is also significant for the discarding of frames. In accordance with the CCITT recommendation, it is allowable to discard a frame e.g. under congestion conditions if the DE bit of the frame has been set to one. As the other bits in the FR frame are not relevant to the present invention, they will not be described more closely herein. References 2 and 4 mentioned above are referred to for a more detailed description.

At a subscriber node on the periphery of the network (FIG. 2), the subscriber connections 14a, 14b, etc., (which in the example illustrated in FIG. 2 are connected to the same node) are connected at first to an identification and control unit 61, which receives FR frames formed in bridges 13 (FIG. 1). The identification and control unit 61 reads the data link connection identifier DLCI from the address field of the frame, and forwards the frame to an input buffer $62_1 \ldots 62_n$ corresponding to the virtual connection indicated by the identifier. Each data link has a specific selector S3 which selects frames from the input buffers of each virtual channel and forwards them further to a centralized router 16, which routes the frames further to a classification unit 43 of the correct data link (the figure shows only one outbound data link). The classification unit 43 reads the identifier DLCI from the address field of the frame and selects from table T the service class corresponding to the virtual channel indicated by the identifier. On the basis of the classification it has completed, the classification unit 43 applies each frame to an output buffer 64a, 64b or 64c corresponding to the service class of the frame. Each outbound data link thus has three output buffers, one for each service class. The selector S2 selects the frames from the service-class-specific output buffers 64a . . . 64c and forwards them to the trunk connection.

Traffic transmitted by the subscribers over the FR network is thus buffered on the input side of the subscriber node specifically for each virtual connection. Incoming frames 39 are chained dynamically over each virtual connection. Depending on the service class of the virtual connection, the chain length has a predetermined allowable maximum value; this is smaller in service classes 1 and 3 and greater in service class 2. The selector S3 reads the buffers $62_1 \ldots 62_n$ e.g. in proportion to the amount of traffic allocated to them, whereby the fairness principle is met.

When a node in the network is congested, the aim is to reduce traffic on the virtual connections running through it already at the subscriber node at the source end of the network; thus the frames will not load the other resources of the network only to be discarded on reaching the congested node. According to the invention, this is carried out in such a way that the identification and control unit 61 of the subscriber node monitors the fill rate of each virtual-channel-specific buffer $62_1 \ldots 62_n$ (in a manner known per se), and discards all the contents of a buffer if the buffer receives a frame while being full. At the same time, the identification and control unit discards this incoming frame (which may be, for instance, the first frame of a longer frame packet). The frames received thereafter are stored in the emptied buffer. In FIG. 2, the operations of the identification and control unit for controlling and emptying the buffer are indicated with bidirectional arrows FC.

Discarding all the contents of the buffer at a time relieves congestion in the network considerably more than discarding only a few frames. The level of congestion in the network becomes considerably lower when the entire virtual-channel-specific buffer is emptied, the length of the buffer being typically dozens of frames. Emptying the buffer ensures that the virtual channel in question hardly loads the network at all for a while. This also makes it possible to avoid unnecessary loading of the network, as frames which would have to be discarded at a later stage because of congestion are not supplied to the network.

In view of the applications using the network, the method of the invention has the advantage that the frame loss probability is lower than before, as a result of which the load caused by retransmissions is also reduced. Discarding a whole buffer leads very close to a situation where an entire window of frames is discarded and must be retransmitted by the application protocol. It is therefore advantageous to adjust the length of a virtual-channel-specific buffer to correspond substantially to the length of a window of frames sent at a time by an application using the network.

FIG. 4 illustrates the processing of frames at a trunk node of the network. An FR frame 39 of the format described above is received at first by a classification unit 43 specific for each data link. The classification unit 43 reads the data link connection identifier from the address field of the frame, and selects the service class corresponding to the virtual channel indicated by the identifier. The virtual channels and the respective service classes are stored in a table T. On the basis of the classification it has completed, the classification unit 43 applies each frame to an input buffer 44a, 44b or 44c corresponding to the service class of the frame. Each inbound data link has thus three input buffers, one for each service class. Each data link has a specific selector S1 which selects the frames from the service-class-specific buffers and forwards them within the node. On the output side of the trunk node, the frames are connected to an interface corresponding to their particular data link. At this interface they are supplied in accordance with the service class selected on the input side of the node to one of the three service-class-specific output buffers 45a, 45b or 45c, from which the selector S2 reads the frames further to the trunk connection. Each outbound data link has thus three output buffers, one for each service class. Alternatively, classification units may be provided separately for each data link even on the output side of the node, in which case classification data need not be transferred within the node.

Although the invention has been described above with reference to the examples shown in the accompanying drawings, it will be obvious that the invention is not restricted to these examples, but can be modified within the scope of the inventive concept disclosed above and in the appended claims. In its details, the structure of a subscriber node, for example, may vary in many ways even though frames are discarded according to the principle of the invention. There may be, for instance, a separate fill rate control unit per each virtual-channel-specific buffer, said control unit transmitting data on the fill rate to a unit 61, which (in addition to identifying the virtual channel) merely empties the buffer.

We claim:

1. A method for congestion management in an frame relay network comprising subscriber nodes to which subscribers (A . . . E) are connected over data links (14a . . . 14e), said method comprising determining the virtual channel associated with a frame (39) to be transmitted when it is received from a subscriber connection at a subscriber node, characterized in that data is buffered at the input boundary of a subscriber node to virtual-channel-specific buffers ($62_1$ . . . $62_n$) .

the fill rate of said buffers is monitored continuously, and when a frame is received in a virtual-channel-specific buffer which is full, substantially all the contents of the buffer are discarded.

2. A method according to claim 1, characterized in that the length of the virtual-channel-specific buffer ($62_1$ . . . $62_n$) is adjusted to correspond substantially to the length of the frame packet sent at a time by an application using the network.

3. A subscriber node of a frame relay network, to which node subscribers (A . . . E) of the network are connected over data links (14a . . . 14e), said node comprising input buffers at the input boundary of the node, and output buffers at the output boundary of the node, and means (16) for relaying frames from a input buffer to a desired output buffer, characterized in that it comprises virtual-channel-specific buffers ($62_1$ . . . $62_n$) at the input boundary, first means (61) for monitoring the fill rate of said virtual-channel-specific buffers, and second means (61) responsive to said first means (61) and to the frame received for discarding the contents of a virtual-channel-specific buffer.

4. A subscriber node according to claim 1, characterized in that said first and second means are provided at the same identification and control unit (61), through which the frames received at the subscriber node are supplied to the virtual-channel-specific buffers ($62_1$ . . . $62_n$).

* * * * *